US012654484B2

(12) United States Patent
Dimas et al.

(10) Patent No.: US 12,654,484 B2
(45) Date of Patent: Jun. 16, 2026

(54) METALIZED POWDER PAINTED COLOR SAMPLE

(71) Applicant: Color Communications, LLC, Chicago, IL (US)

(72) Inventors: Jerald Dimas, West Chicago, IL (US); Robert E. Kester, Orland Park, IL (US)

(73) Assignee: Color Communications, LLC, Chicago, IL (US)

( * ) Notice: Subject to any disclaimer, the term of this patent is extended or adjusted under 35 U.S.C. 154(b) by 278 days.

(21) Appl. No.: 18/537,165

(22) Filed: Dec. 12, 2023

(65) Prior Publication Data

US 2025/0187364 A1 Jun. 12, 2025

(51) Int. Cl.

| | |
|---|---|
| ***B44D 3/00*** | (2006.01) |
| ***D21H 19/08*** | (2006.01) |
| ***D21H 19/44*** | (2006.01) |
| ***D21H 19/82*** | (2006.01) |
| ***D21H 19/84*** | (2006.01) |
| ***D21H 23/50*** | (2006.01) |
| ***D21H 23/72*** | (2006.01) |

(52) U.S. Cl.

CPC ............. *B44D 3/003* (2013.01); *D21H 19/08* (2013.01); *D21H 19/44* (2013.01); *D21H 19/822* (2013.01); *D21H 19/84* (2013.01); *D21H 23/50* (2013.01); *D21H 23/72* (2013.01)

(58) Field of Classification Search

None

See application file for complete search history.

(56) References Cited

U.S. PATENT DOCUMENTS 4,457,718 A * 7/1984 Lerner ...................... G09F 5/04 206/472
6,045,914 A 4/2000 Sullivan et al.

(Continued)

FOREIGN PATENT DOCUMENTS

CN 105256659 A * 1/2016 ............. D21H 19/08
CN 113095368 7/2021

(Continued)

OTHER PUBLICATIONS

Kato—JP 2004-053260 A—PCT D1—MT—Sample book—2004 (Year: 2004).*

(Continued)

*Primary Examiner* — John Vincent Lawler

(74) *Attorney, Agent, or Firm* — Reinhart Boerner Van Deuren s.c.

(57) ABSTRACT

A metalized powder painted color sample for facilitating selection of a powder paint, the powder paint being applicable to a base material, is described. The metalized powder painted color sample includes a paper substrate sheet including a first side, a metallic layer bonded to the first side of the paper substrate sheet, and a powder paint layer bonded to the metallic layer. The metallic layer includes aluminum and has a thickness of between 15 nanometers and 50 nanometers. The powder paint layer includes a cured polymer powder paint and having a thickness of between 20 micrometers and 140 micrometers. In some embodiments, at least a portion of the metalized powder painted color sample has a same color and a same texture as the base material when the powder paint has been applied to the base material.

20 Claims, 4 Drawing Sheets

(56) References Cited

U.S. PATENT DOCUMENTS

| | | | | |
|---|---|---|---|---|
| 7,005,171 | B2 | 2/2006 | Lerner | |
| 7,914,285 | B2 | 3/2011 | Boney | |
| 9,757,968 | B1 | 9/2017 | Guzzo | |
| 2003/0072907 | A1 * | 4/2003 | Lerner | B44D 3/003 156/289 |
| 2004/0067350 | A1 | 4/2004 | Janssen et al. | |
| 2005/0196607 | A1 | 9/2005 | Shih | |
| 2006/0165979 | A1 | 7/2006 | Kinsey | |
| 2007/0131136 | A1 | 6/2007 | Zhang | |
| 2007/0154671 | A1 | 7/2007 | Shih | |
| 2008/0081142 | A1 | 4/2008 | Zeik | |
| 2008/0092457 | A1 | 4/2008 | Malone | |
| 2010/0055371 | A1 | 3/2010 | Edwards | |
| 2010/0252187 | A1 | 10/2010 | Calderas | |
| 2011/0097506 | A1 | 4/2011 | Shah | |
| 2011/0162794 | A1 | 7/2011 | Zeik | |
| 2016/0075118 | A1 | 3/2016 | Kleppen | |
| 2019/0338166 | A1 | 11/2019 | Hebert | |
| 2024/0293953 | A1 | 9/2024 | Dimas | |
| 2024/0368431 | A1 | 11/2024 | Dimas et al. | |
| 2025/0282982 | A1 | 9/2025 | Dimas et al. | |

FOREIGN PATENT DOCUMENTS

| | | | | |
|---|---|---|---|---|
| EP | 4123089 | | 1/2023 | |
| JP | 2002-200700 | | 7/2002 | |
| JP | 2004-053260 | | 2/2004 | |
| JP | 2004053260 | A * | 2/2004 | B05D 5/06 |
| JP | 2005512862 | | 5/2005 | |
| WO | WO9964235 | | 12/1999 | |
| WO | WO02070623 | | 9/2002 | |

OTHER PUBLICATIONS

Wang—CN 105256659 A—MT—vapor-deposit AI on paper+ powder paint—2016 (Year: 2016).*

International Search Report and Written Opinion for International Application No. PCT/US2024/059739, dated Apr. 4, 2025, 10 pages.

Machine Translation of JP2005-512862 A (Year: 2005).

"Powder Coating Sample Panels—2 x 3.5 Blank Aluminum Ready to Coat Panels!" webpage, 2 pages, The Powder Coat Store, retrieved on Dec. 12, 2023. Retrieved from the internet: <https://thepowdercoatstore.com/collections/panels/products/blank-panels-for-powder-coat235>.

* cited by examiner

METALIZED POWDER PAINTED COLOR SAMPLE

BACKGROUND OF THE INVENTION

The present invention relates generally to the field of color samples. The present invention relates specifically to a color sample for facilitating selection of a powder paint color, the color sample including a metalized substrate sheet, such as paper, that has been powder painted.

SUMMARY OF THE INVENTION

One embodiment of the invention relates to a metalized powder painted color sample for facilitating selection of a powder paint, the powder paint being applicable to a base material. The metalized powder painted color sample includes a paper substrate sheet including a first side. The paper substrate sheet has a thickness of between 2 millimeters and 0.15 millimeters. The metalized powder painted color sample includes a metallic layer bonded to the first side of the paper substrate sheet. The metallic layer includes aluminum and has a thickness of between 15 nanometers and 50 nanometers. The metalized powder painted color sample includes a powder paint layer bonded to the metallic layer. The powder paint layer includes a cured, thermosetting polymer powder paint and has a thickness of between 20 micrometers and 140 micrometers. At least a portion of the metalized powder painted color sample has a same color and a same texture as the base material when the powder paint has been applied to the base material.

Another embodiment of the invention relates to a metalized powder painted color sample for facilitating selection of a powder paint, the powder paint being applicable to a base material. The metalized powder painted color sample includes a paper substrate sheet including a first side. The paper substrate sheet has a thickness of between 2 millimeters and 0.15 millimeters. The metalized powder painted color sample includes a metallic layer bonded to the first side of the paper substrate sheet. The metallic layer includes aluminum and has a thickness of between 15 nanometers and 50 nanometers. The metalized powder painted color sample includes a powder paint layer bonded to the metallic layer. The powder paint layer includes a cured, thermoplastic polymer powder paint and has a thickness of between 20 micrometers and 140 micrometers. The metallic layer is applied to the paper substrate via metalized vacuum vaporization. The powder paint layer is applied to the metal layer via electrostatic spraying.

Another embodiment of the invention relates to a metalized powder painted color sample chart for facilitating selection of a powder paint. The powder paint is applicable to a base material. The metalized powder painted color sample chart includes a first metalized powder painted color sample. The first metalized powder painted color sample includes a first paper substrate sheet including a first side. The first paper substrate sheet has a thickness of between 2 millimeters and 0.15 millimeters. The first metalized powder painted color sample includes a first metallic layer bonded to the first side of the first paper substrate sheet. The first metallic layer includes aluminum and has a thickness of between 15 nanometers and 50 nanometers. The first metalized powder painted color sample includes a first powder paint layer bonded to the first metallic layer. The first powder paint layer includes a first cured, thermosetting polymer powder paint and has a thickness of between 20 micrometers and 140 micrometers. The metalized powder painted color sample chart includes a second metalized powder painted color sample. The second powder painted color sample includes a second paper substrate sheet including a second side. The second paper substrate sheet has a thickness of between 2 millimeters and 0.15 millimeters. The second powder painted color sample includes a second metallic layer bonded to the second side of the second paper substrate sheet. The second metallic layer includes aluminum and has a thickness of between 15 nanometers and 50 nanometers. The second powder painted color sample includes a second powder paint layer bonded to the second metallic layer. The second powder paint layer includes a second cured, thermosetting polymer powder paint and has a thickness of between 20 micrometers and 140 micrometers. The metalized powder painted color sample chart includes a panel. The first metalized powder painted color sample and the second metalized powder painted color sample are bonded to the panel. The first cured, thermosetting polymer powder paint and the second cured, thermosetting polymer powder paint are different thermosetting polymer powder paints.

Additional features and advantages will be set forth in the detailed description which follows, and, in part, will be readily apparent to those skilled in the art from the description or recognized by practicing the embodiments as described in the written description and claims thereof, as well as the appended drawings. It is to be understood that both the foregoing general description and the following detailed description are exemplary.

The accompanying drawings are included to provide further understanding and are incorporated in and constitute part of the specification. The drawings illustrate one or more embodiments, and together with the description serve to explain the principles and operation of various embodiments.

Alternative exemplary embodiments relate to other features and combinations of features as may be generally recited in the claims.

BRIEF DESCRIPTION OF THE DRAWINGS

This application will become more fully understood from the following detailed description, taken in conjunction with the accompanying figures, wherein like reference numerals refer to like elements in which.

DETAILED DESCRIPTION

Referring generally to the figures, various embodiments of a metalized powder painted color sample are shown.

Embodiments of the metalized powder painted color sample discussed herein include an innovative metalized substrate to provide for a variety of desired characteristics, including a metallic surface to apply powder paint to that requires less metallic material than traditional powder painted color samples. Traditionally, powder painted color samples are formed by applying powder paint to an aluminum sheet. In order to have the rigidity necessary to apply the powder paint and handle the color sample, typical aluminum color samples would be formed from sheets of aluminum having thicknesses on the scale of about 0.050 inches. Applicant has found it beneficial to provide a powder painted color sample that utilizes a metalized paper substrate with a metallic layer having a thickness on the scale of about 15-50 nanometers. This provides for a color sample substrate that can be powder painted and handled while requiring substantially less metallic material than traditional powder painted color samples, and thereby producing a more environmentally friendly sample and significantly reducing material costs.

Figure 1:
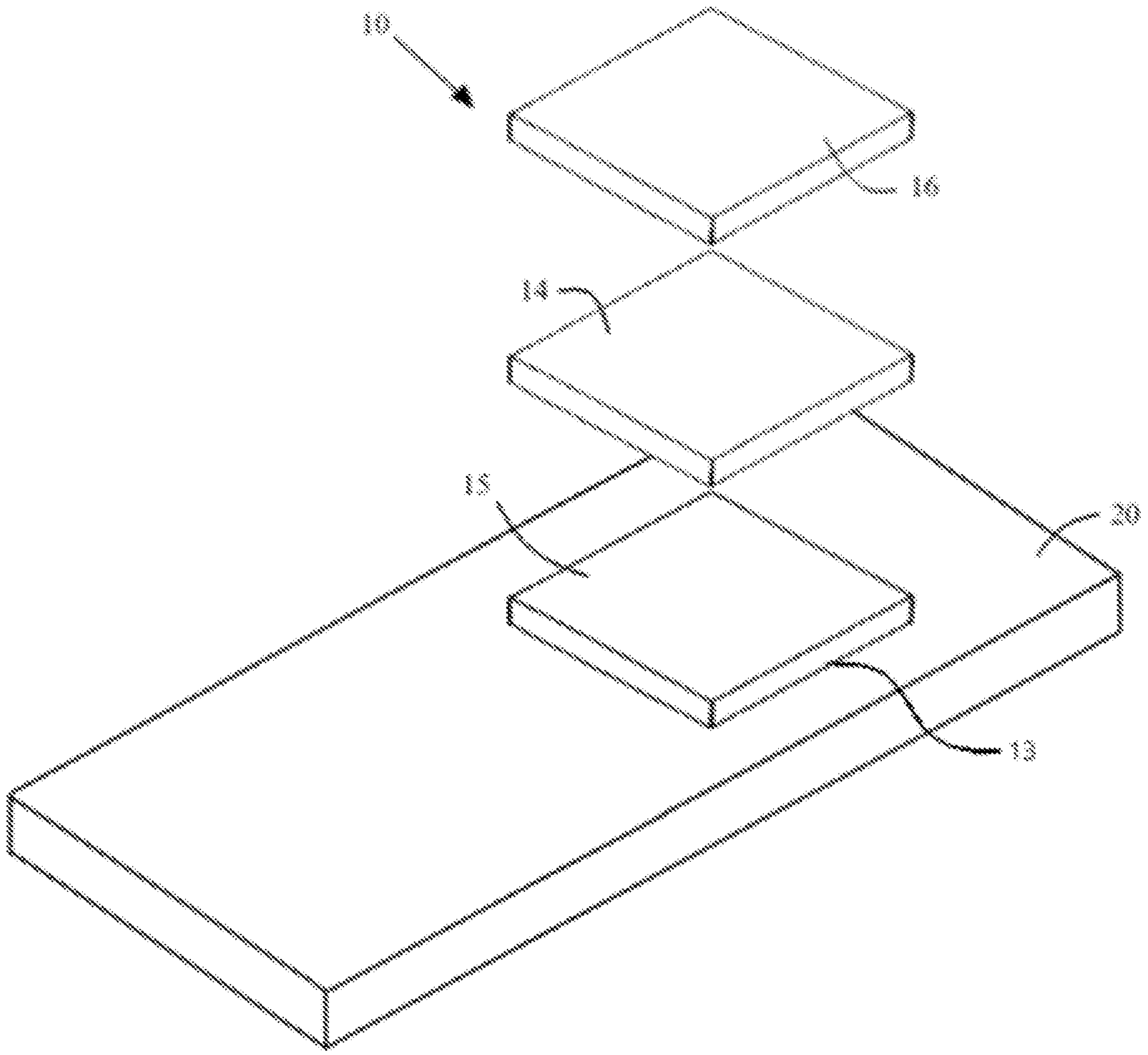
FIG. 1 is an exploded perspective view of layers of a metalized powder painted color sample in contact with a base material, according to an exemplary embodiment.

Referring to FIG. 1, an exploded perspective view of a metalized powder painted color sample 10 applied to a base material 20 is shown according to an exemplary embodiment. Color sample 10 includes a substrate sheet 13. Color sample 10 includes a metallic layer 14 that is applied to and bonded to a first side 15 of substrate sheet 13. Color sample 10 includes a coating layer 16 that is applied to metallic layer 14 on an opposing side of metallic layer 14 from substrate sheet 13. Base material 20 can include materials, such as, for example, aluminum, steel, iron, titanium, brass, and/or bronze, woods, glass, plastics, or composite materials.

Substrate sheet 13 can be formed from a paper material. In specific embodiments, substrate sheet 13 is formed from paper stock or cardstock. Substrate sheet 13 has a thickness of between 0.15 millimeters and 2 millimeters. Substrate sheet 13 can be formed from 10 pt. paper, or paper having a thickness of about 0.010 inches. In various embodiments, substrate sheet 13 has a thickness of about 0.008 inches, 0.012 inches, 0.014 inches, 0.016 inches, 0.018 inches, 0.020 inches or 0.022 inches. In some embodiments, substrate sheet 13 has a thickness greater than 0.022 inches. Substrate sheet 13 can be formed from paper having a weight of between 200 grams per square meter and 300 grams per square meter. In a specific embodiment, substrate sheet 13 has a weight of between about 244.56 grams per square meter and 252.08 grams per square meter.

Metallic layer 14 is applied and bonded to the first side 15 of substrate sheet 13 through metallization such that the combination of metallic layer 14 and substrate sheet 13 results in a metalized paper. In a specific embodiment, metallic layer 14 is applied to substrate sheet 13 by metalized vacuum vaporization such that metallic layer 14 is formed from aluminum. This metalized vacuum vaporization process includes placing substrate sheet 13 in a vacuum chamber. Aluminum is heated in the vacuum chamber, the low pressure of the vacuum chamber causing the heated aluminum to vaporize. Substrate sheet 13 is exposed to the aluminum vapor, resulting in aluminum deposition on substrate sheet 13 that forms metallic layer 14.

Metallic layer 14 has a thickness of between 0.005 micrometers and 5 micrometers. In some embodiments, metallic layer 14 has a thickness of between 10 nanometers and 100 nanometers, or between 15 nanometers and 50 nanometers. In another embodiment, metallic layer 14 has a thickness of between about 20 nanometers and about 30 nanometers. Applicant has found it beneficial to provide a metallic layer having thicknesses as described above to provide a metalized paper substrate for a powder painted color sample that requires less metallic material, such as aluminum, than a traditional powder painted color sample using a metallic foil substrate. Metallic layer 14 provides substrate sheet 13 with a surface capable of bonding to powder paint through electrostatic spraying, as well as a surface that provides a similar color and texture once powder painted to a powder painted portion of base material 20.

Figure 2:
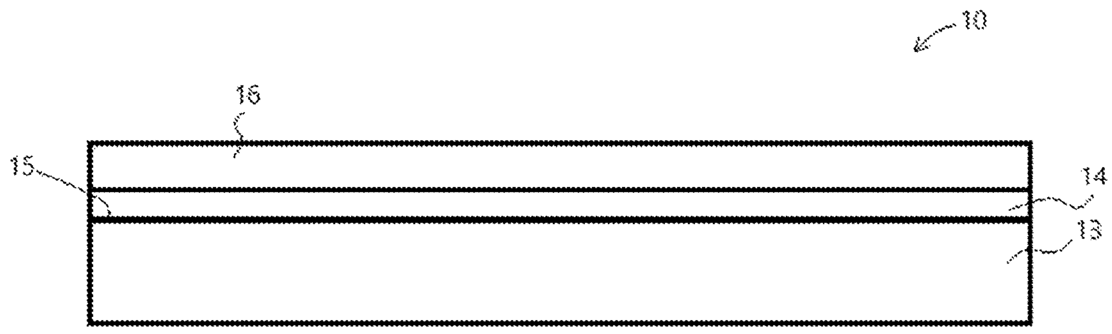
FIG. 2 is a side view of layers of a metalized powder painted color sample, according to an exemplary embodiment.

As shown in FIG. 2, coating layer 16 forms an exterior surface of color sample 10. Coating layer 16 provides color sample 10 with an external sample color and sample texture. Coating layer 16 includes a powder paint. In a specific embodiment, the powder paint includes a thermosetting polymer, such as an epoxy. The powder paint can also or alternatively include a thermoplastic polymer, such as polyester. Coating layer 16 has a thickness of between 10 micrometers and 500 micrometers. Specifically, coating layer 16 can have a thickness of between 15 micrometers and 250 micrometers. In a specific embodiment, coating layer 16 has a thickness of between about 25 micrometers and about 125 micrometers. In another embodiment, coating layer 16 has a thickness of between about 50 micrometers and about 100 micrometers. Coating layer 16 can have a thickness of about 75 micrometers. Coating layer 16 can have a thickness of between 10 percent and 50 percent of the thickness of substrate sheet 13.

Coating layer 16 is applied to metallic layer 14 by electrostatic spraying. When applying the coating layer 16, substrate sheet 13 and metallic layer 14 are electrically grounded, and the powder paint that forms coating layer 16 is applied electrostatically at an electric potential difference from the substrate sheet 13 and metallic layer 14 of between about 50 kilovolts and 100 kilovolts. In a specific embodiment, the powder paint that forms coating layer 16 is set on metallic layer 14 by a curing process. The curing process includes heat treating color sample 10 at about 200 degrees Celsius for between 10 minutes and 20 minutes. Specifically, color sample 10 can be heat treated at 200 degrees Celsius for about 15 minutes to set the coating layer 16 on metallic layer 14.

Figure 3:
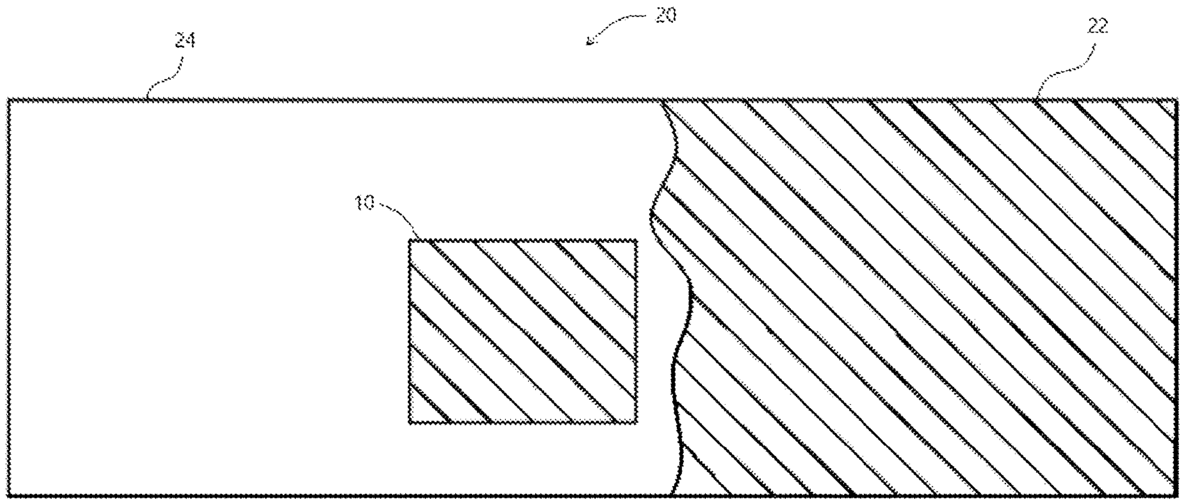
FIG. 3 is a top view of a metalized powder painted color sample applied to a base material having the same powder paint coating as the powder paint to which the color sample represents, according to an exemplary embodiment.

Referring to FIG. 3, color sample 10 is shown applied to base material 20 having a coated portion 22 and an uncoated portion 24, according to an exemplary embodiment. Coated portion 22 of base material 20 includes powder paint. In a specific embodiment, the powder paint applied to coated portion 22 is the same powder paint in coating layer 16 of color sample 10. Color sample 10 is placed on or against uncoated portion 24 such that substrate sheet 13 is in contact with base material 20 and coating layer 16 of color sample 10 is facing away from base material 20 and visible to observers. The composition of color sample 10 is configured to provide a similar appearance to coated portion 22 of base material 20 to facilitate selection of a powder paint for application to uncoated portion 24.

Coating layer 16 is configured to provide at least a portion of color sample 10 with a sample color that is the same color as a coated base color of coated portion 22. A portion of the coating layer 16 of color sample 10 has a surface area of at least one square inch. Throughout this document, color is measured as CIELAB coordinates. CIELAB coordinates include a lightness value, L*, measured on a scale from 0-100, wherein 0 represents black and 100 represents white, a green-red value, a*, wherein negative values indicate green color and positive values indicate red color, and a blue-yellow value, b*, wherein negative values indicate blue color and positive values indicate yellow color. A first color is the same as a second color if the ΔE ("Delta E") value between the CIELAB coordinates of the first color and the second color is less than or equal to 10. The ΔE value is defined by the following equation, commonly referred to as the CIE76 color difference formula:

$$\Delta E = \sqrt{(L_2^* - L_1^*)^2 + (a_2^* - a_1^*)^2 + (b_2^* - b_1^*)^2}$$

wherein ($L^*_1$, $a^*_1$, $b^*_2$) represents the CIELAB coordinates representing the first color and ($L^*_2$, $a^*_2$, $b^*_2$) represents the CIELAB coordinates of the second color.

According to an exemplary embodiment, the ΔE value between the sample color of color sample 10 and the coated base color of coated portion 22 is less than or equal to 20. Additionally, the ΔE value between the sample color of color sample 10 and the coated base color of coated portion 22 can be less than or equal to 10. In a specific embodiment, the ΔE value between the sample color of color sample 10 and the coated base color of coated portion 22 is less than or equal to 5, such that the sample color and the coated base color are the same color. In another embodiment, the ΔE value between the sample color of color sample 10 and the coated base color of coated portion 22 is less than or equal to 2.

Throughout this document, texture is measured as arithmetic average roughness (Ra) of a surface. An Ra value is a mean of the absolute deviation from a mean line of the profile of a surface as measured over a 0.01-inch length of the profile. The mean line of a profile of a surface is a line corresponding to the average location of the profile with respect to deviations of the profile in a direction perpendicular to the surface. A first surface has the same texture as a second surface if an average Ra value of the first surface is within a 10 percent range above or below an average Ra value of the second surface. An average Ra value of a surface is the mean of Ra values of adjacent segments of a profile of the surface that span the entire profile.

Coating layer 16 is configured to provide at least a portion of color sample 10 with a sample texture that is the same texture as a coated base texture of coated portion 22 of base material 20. According to an exemplary embodiment, an average Ra value of color sample 10 is within 20 percent of an average Ra value of coated portion 22. Additionally, an average Ra value of color sample 10 can be within 10 percent of an average Ra value of coated portion 22 such that color sample 10 has a same texture as coated portion 22. In a specific embodiment, an average Ra value of color sample 10 is within 5 percent of an average Ra value of coated portion 22. In another embodiment, an average Ra value of color sample 10 is within 2 percent of an average Ra value of coated portion 22.

Coating layer 16 can also be configured to provide at least a portion of color sample 10 with a sample surface having the same coefficient of static friction as coated portion 22 of base material 20 when applied to a test surface, such as uncoated portion 24. According to an exemplary embodiment, a coefficient of static friction of the color sample 10 is within 20 percent of a coefficient of static friction of coated portion 22. Additionally, a coefficient of static friction of color sample 10 can be within 10 percent of a coefficient of static friction of coated portion 22. In a specific embodiment, a coefficient of static friction of color sample 10 is within 5 percent of a coefficient of static friction of coated portion 22. In another embodiment, a coefficient of static friction of color sample 10 is within 2 percent of a coefficient of static friction of coated portion 22.

Figure 4:
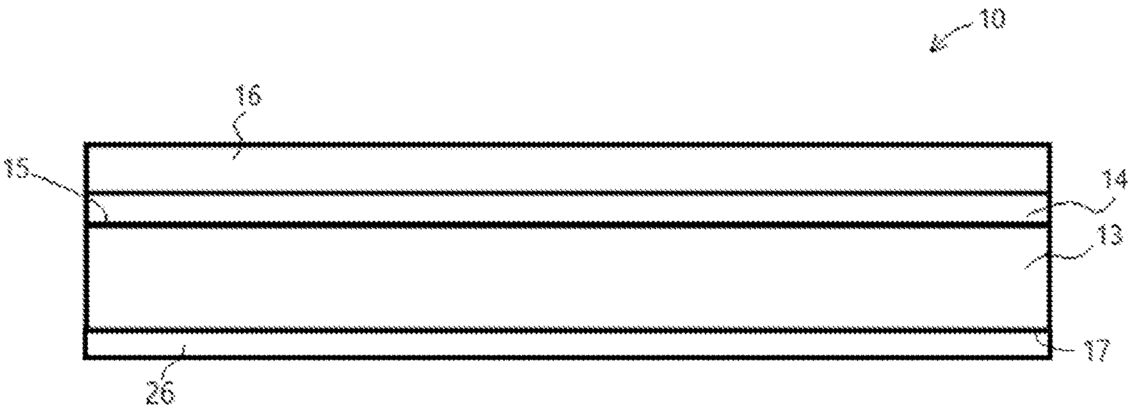
FIG. 4 is a side view of layers of a metalized powder painted color sample having a metallic layer on two sides of the color sample, according to an exemplary embodiment.

Referring to FIG. 4, color sample 10 is shown including a second metallic layer 26, according to another exemplary embodiment. In some embodiments second metallic layer 26 is bonded to a second side 17 of substrate sheet 13 opposite first side 15. Second metallic layer 26 is applied to second side 17 of substrate sheet 13 by the same metallization process as described above for applying metallic layer 14 to first side 15 of substrate sheet 13 and is formed from the same metallic material as metallic layer 14. Applicant has found that a metalized paper substrate for color sample 10 that includes metallic layers on opposing sides of substrate sheet 13 provides for increased structural stability of color sample 10 and reduces the likelihood and/or degree of warping or distortion of the shape of color sample 10 following heat treating.

Figure 5:
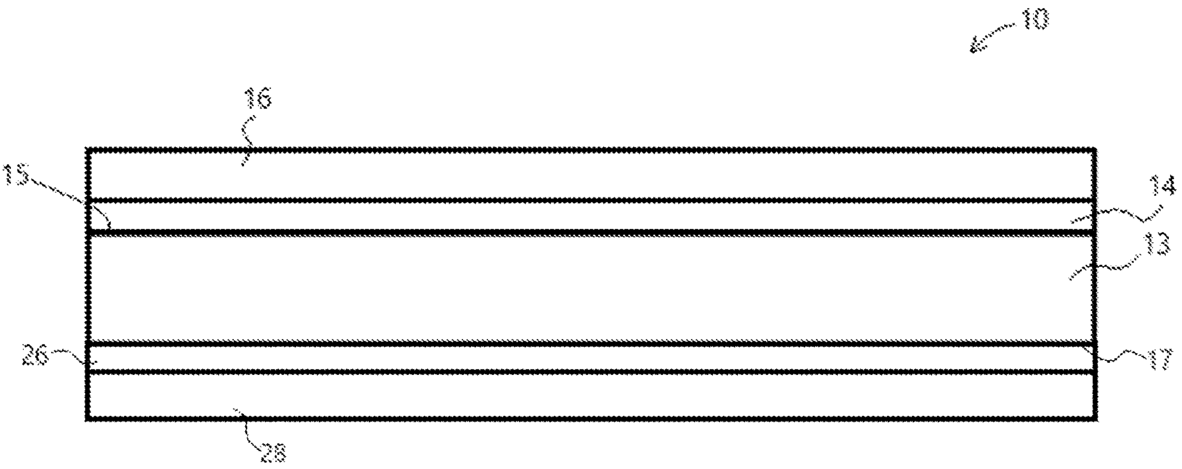
FIG. 5 is a side view of layers of a metalized powder painted color sample having both a metallic layer and a powder paint layer on two sides of the color sample, according to an exemplary embodiment.

Referring to FIG. 5, color sample 10 is shown including a second metallic layer 26 and a second coating layer 28, according to another exemplary embodiment. Second coating layer 28 is applied to second metallic layer 26 through the same process as described above for applying coating layer 16 to metallic layer 14. In a specific embodiment, second coating layer 28 includes the same powder paint as coating layer 16. In an alternative embodiment, second coating layer 28 includes a different powder paint than the powder paint included in coating layer 16 such that second coating layer 28 and coating layer 16 do not have the same color and/or texture. Second coating layer 28 and coating layer 16 can have different colors such that the ΔE value between the color of second coating layer 28 and coating layer 16 is greater than 10.

Figure 6:
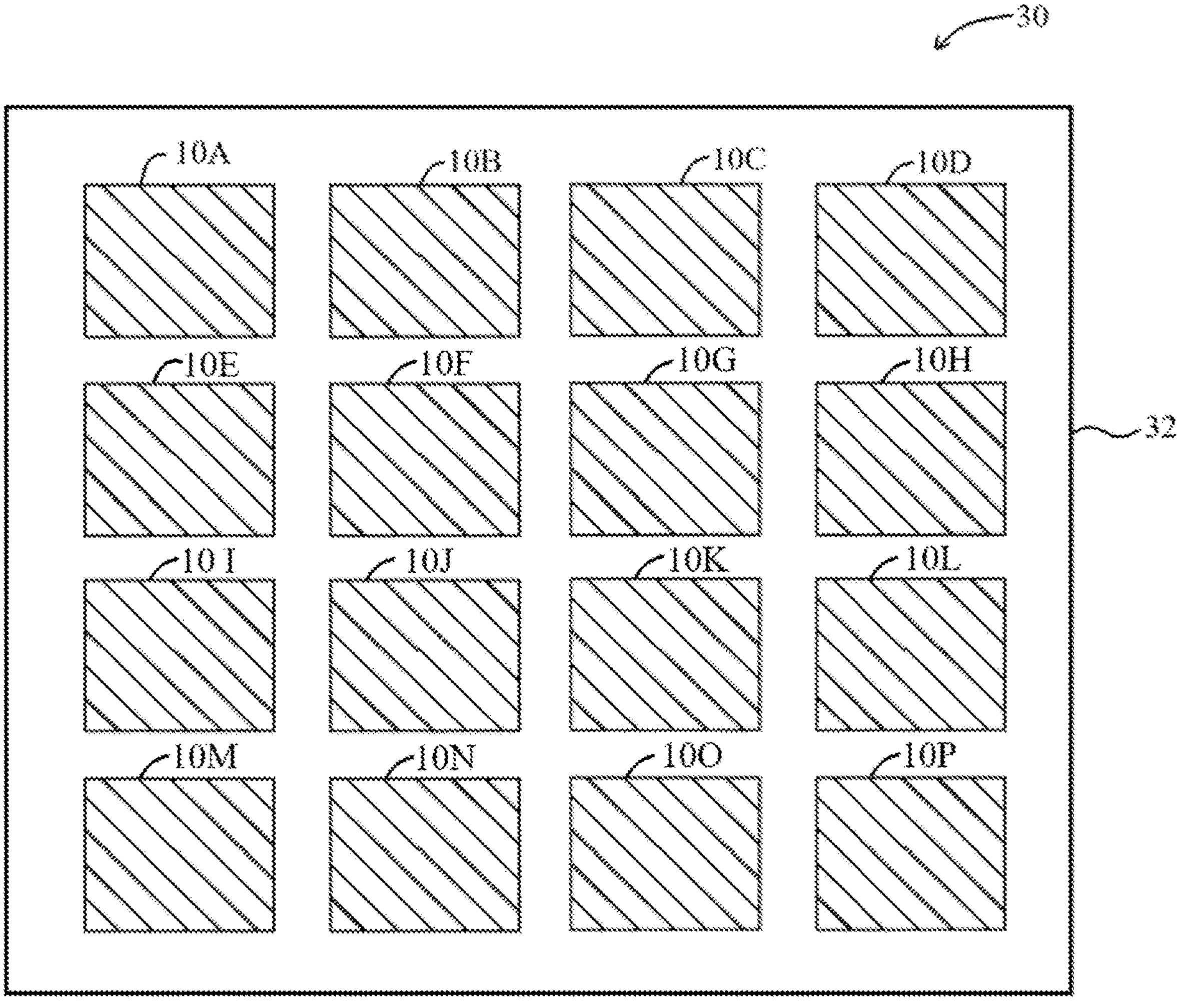
FIG. 6 is a top view of a color chart including a plurality of metalized powder painted color samples, according to an exemplary embodiment.

Referring to FIG. 6, a color chart 30 including a plurality of metalized powder painted color samples 10A-10P and a panel 32 according to an exemplary embodiment. Panel 32 can be formed from materials including paper, plastics, wood, metals, and/or composite materials. Color samples 10A-10P are adhered to panel 32 to form color chart 30. In various embodiments, color chart 30 includes 2, 3, 4, 5, 6, 7, 8, 9, 10, 11, 12, 13, 14, 15, 16, 17, 18, 19, or 20 metalized powder painted color samples. Color chart 30 can include more than 20 metalized powder painted color samples. Color chart 30 is configured such that each of color samples 10A-10P has a different color, texture, and/or finish. In a specific embodiment, color sample 10A includes a different powder paint than a powder paint included in color sample 10B such that color sample 10A has a sample color that has a ΔE value that is greater than 10 with respect to a sample color of color sample 10B. Each of color samples 10A-10P can include different powder paints such that each of color samples 10A-10P has a sample color with a ΔE value greater than 10 when compared to any other of color samples 10A-10P. In some embodiments, one or more of the plurality of color samples 10A-10P has a color, texture, and/or finish that is the same as at least one other of the plurality of color samples 10A-10P. Applicant has found it beneficial to provide a color chart with a plurality of metalized powder painted color samples in order to facilitate selection of a powder paint by allowing observers to quickly compare color, texture, finish, etc. of a variety of powder paints.

It should be understood that the figures illustrate the exemplary embodiments in detail, and it should be understood that the present application is not limited to the details or methodology set forth in the description or illustrated in the figures. It should also be understood that the terminology is for the purpose of description only and should not be regarded as limiting.

Further modifications and alternative embodiments of various aspects of the invention will be apparent to those skilled in the art in view of this description. Accordingly, this description is to be construed as illustrative only. The construction and arrangements, shown in the various exemplary embodiments, are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Some elements shown as integrally formed may be constructed of multiple parts or elements, the position of elements may be reversed or otherwise varied, and the nature or number of discrete elements or positions may be altered or varied. The order or sequence of any process, logical algorithm, or method steps may be varied or re-sequenced according to alternative embodiments. Other substitutions, modifications, changes and omissions may also be made in the design, operating conditions and arrangement of the various exemplary embodiments without departing from the scope of the present invention.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that any particular order be inferred. In addition, as used herein, the article "a" is intended to include one or more component or element, and is not intended to be construed as meaning only one. For purposes of this disclosure, the term "about," when referring to a length, thickness, distance, or a numeric value generally (e.g., a length of about 10 inches), means within 10 percent above or below the referenced value (e.g., between 9 and 11 inches).

While the current application recites particular combinations of features in the claims appended hereto, various embodiments of the invention relate to any combination of any of the features described herein whether or not such combination is currently claimed, and any such combination of features may be claimed in this or future applications. Any of the features, elements, or components of any of the exemplary embodiments discussed above may be used alone or in combination with any of the features, elements, or components of any of the other embodiments discussed above.

What is claimed is:

1. A metalized powder painted color sample for facilitating selection of a powder paint, the powder paint being applicable to a base material, the metalized powder painted color sample comprising:

a paper substrate sheet including a first side, the paper substrate sheet having a thickness of between 2 millimeters and 0.15 millimeters;

a metallic layer bonded to the first side of the paper substrate sheet, the metallic layer comprising aluminum and having a thickness of between 15 nanometers and 50 nanometers;

a powder paint layer bonded to the metallic layer, the powder paint layer comprising a cured, thermosetting polymer powder paint and having a thickness of between 20 micrometers and 140 micrometers;

wherein at least a portion of the metalized powder painted color sample has a same color and a same texture as the base material when the powder paint has been applied to the base material.

2. The metalized powder painted color sample of claim 1, wherein the thickness of the metallic layer is between about 20 nanometers and about 30 nanometers.

3. The metalized powder painted color sample of claim 1, wherein the cured, thermosetting polymer powder paint of the powder paint layer is a same thermosetting polymer powder paint as the powder paint applied to the base material.

4. The metalized powder painted color sample of claim 1, wherein the metallic layer is bonded to the paper substrate via metalized vacuum vaporization.

5. The metalized powder painted color sample of claim 4, wherein a second metallic layer is applied to a second side of the paper substrate opposite the first side via metalized vacuum vaporization; wherein the second metallic layer comprises aluminum and has a thickness of between 15 nanometers and 50 nanometers.

6. The metalized powder painted color sample of claim 5 further comprising a second powder paint layer bonded to the second metallic layer, the second powder paint layer comprising a second cured, thermosetting polymer powder paint and having a thickness of between 20 micrometers and 140 micrometers.

7. The metalized powder painted color sample of claim 1, wherein the powder paint layer is applied to the metal layer via electrostatic spraying.

8. The metalized powder painted color sample of claim 7, wherein an electric potential difference between the metallic layer and the powder paint during the electrostatic spraying was between 50 kilovolts and 100 kilovolts.

9. The metalized powder painted color sample of claim 1, wherein the thermosetting polymer powder paint has been cured via heat treating at 200 degrees Celsius for between 10 minutes and 20 minutes.

10. A metalized powder painted color sample for facilitating selection of a powder paint, the powder paint being applicable to a base material, the metalized powder painted color sample comprising:

a paper substrate sheet including a first side, the paper substrate sheet having a thickness of between 2 millimeters and 0.15 millimeters;

a metallic layer bonded to the first side of the paper substrate sheet, the metallic layer comprising aluminum and having a thickness of between 15 nanometers and 50 nanometers;

a powder paint layer bonded to the metallic layer, the powder paint layer comprising a cured, thermoplastic polymer powder paint and having a thickness of between 20 micrometers and 140 micrometers;

wherein the metallic layer is bonded to the paper substrate via metalized vacuum vaporization; and wherein the powder paint layer is bonded to the metal layer via electrostatic spraying.

11. The metalized powder painted color sample of claim 10, wherein an electric potential difference between the metallic layer and the powder paint during the electrostatic spraying was between 50 kilovolts and 100 kilovolts.

12. The metalized powder painted color sample of claim 10, wherein a second metallic layer is bonded to a second side of the paper substrate opposite the first side via metalized vacuum vaporization; wherein the second metallic layer comprises aluminum and has a thickness of between 15 nanometers and 50 nanometers.

13. The metalized powder painted color sample of claim 12 further comprising a second powder paint layer bonded to the second metallic layer, the second powder paint layer comprising a second cured, thermoplastic polymer powder paint and having a thickness of between 20 micrometers and 140 micrometers.

14. The metalized powder painted color sample of claim 10, wherein the thickness of the metallic layer is between about 20 nanometers and about 30 nanometers.

15. The metalized powder painted color sample of claim 10, wherein the thickness of the powder paint layer is between about 50 micrometers and about 100 micrometers.

16. The metalized powder painted color sample of claim 10, wherein the thermoplastic polymer powder paint has been cured via heat treating at 200 degrees Celsius for between 10 minutes and 20 minutes.

17. A metalized powder painted color sample chart for facilitating selection of a powder paint, the powder paint being applicable to a base material, the metalized powder painted color sample chart comprising:

a first metalized powder painted color sample comprising:

a first paper substrate sheet including a first side, the first paper substrate sheet having a thickness of between 2 millimeters and 0.15 millimeters;

a first metallic layer bonded to the first side of the first paper substrate sheet, the first metallic layer comprising aluminum and having a thickness of between 15 nanometers and 50 nanometers;

a first powder paint layer bonded to the first metallic layer, the first powder paint layer comprising a first cured, thermosetting polymer powder paint and having a thickness of between 20 micrometers and 140 micrometers;

a second metalized powder painted color sample comprising:

a second paper substrate sheet including a second side, the second paper substrate sheet having a thickness of between 2 millimeters and 0.15 millimeters;

a second metallic layer bonded to the second side of the second paper substrate sheet, the second metallic layer comprising aluminum and having a thickness of between 15 nanometers and 50 nanometers;

a second powder paint layer bonded to the second metallic layer, the second powder paint layer comprising a second cured, thermosetting polymer powder paint and having a thickness of between 20 micrometers and 140 micrometers; and a panel, the first metalized powder painted color sample and the second metalized powder painted color sample being bonded to the panel; and wherein the first cured, thermosetting polymer powder paint and the second cured, thermosetting polymer powder paint are different thermosetting polymer powder paints.

18. The metalized powder painted color sample chart of claim 17, wherein the first powder paint layer has a first color corresponding to a first CIELAB coordinate and the second powder paint layer has a second color corresponding to a second CIELAB coordinate; and wherein a ΔE value with respect to the first CIELAB coordinate and the second CIELAB coordinate is greater than 10.

19. The metalized powder painted color sample chart of claim 17, wherein the thickness of the first metallic layer and the thickness of the second metallic layer are each between about 20 nanometers and about 30 nanometers.

20. The metalized powder painted color sample chart of claim 17 further comprising a third metalized powder painted color sample, the third metalized powder painted color sample comprising:

a third paper substrate sheet including a third side, the third paper substrate sheet having a thickness of between 2 millimeters and 0.15 millimeters;

a third metallic layer bonded to the third side of the third paper substrate sheet, the third metallic layer comprising aluminum and having a thickness of between 15 nanometers and 50 nanometers;

a third powder paint layer bonded to the third metallic layer, the third powder paint layer comprising a third cured, thermosetting polymer powder paint and having a thickness of between 20 micrometers and 140 micrometers;

wherein the third cured, thermosetting polymer powder paint is a different thermosetting polymer powder paint than the first cured, thermosetting polymer powder paint and a different thermosetting polymer powder paint than the second cured, thermosetting polymer powder paint.

* * * * *